United States Patent [19]
Reitberger

[11] Patent Number: 5,549,390
[45] Date of Patent: Aug. 27, 1996

[54] GUIDE RAIL

[75] Inventor: Rudolf Reitberger, Munich, Germany

[73] Assignee: Hilti Aktiengesellschaft, Schaan, Liechtenstein

[21] Appl. No.: 342,539

[22] Filed: Nov. 21, 1994

[30] Foreign Application Priority Data

Nov. 19, 1993 [JP] Japan .................. 43 39 541.4

[51] Int. Cl.$^6$ .................. F16C 29/04; F16C 29/02
[52] U.S. Cl. .................. 384/44; 384/42; 384/55
[58] Field of Search .................. 384/31, 35, 42, 384/55, 44, 47

[56] References Cited

U.S. PATENT DOCUMENTS

| | | | |
|---|---|---|---|
| 1,027,759 | 5/1912 | Prellwitz | 384/42 |
| 2,907,610 | 10/1959 | Wise . | |
| 4,682,899 | 7/1987 | Andersson et al. | 384/42 X |
| 4,925,320 | 5/1990 | Foster et al. | 384/42 |
| 4,941,197 | 7/1990 | Roeser | 384/44 |
| 5,324,118 | 6/1994 | Ichida | 384/44 |

FOREIGN PATENT DOCUMENTS

| | | |
|---|---|---|
| 2384989 | 10/1978 | France . |
| 3734922 | 4/1989 | Germany . |
| 4118479 | 1/1992 | Germany . |
| 13224 | 1/1983 | Japan . |

Primary Examiner—Thomas R. Hannon
Attorney, Agent, or Firm—Anderson, Kill, Olick & Oshinsky, P.C.

[57] ABSTRACT

A guide rail for use in drilling, cutting and grinding tools has two first and second pairs of guide surfaces (1, 2, 3, 4) arranged opposite one another relative to a first axis of symmetry (S1). Each pair of first and second guide surfaces are V-shaped and are laterally spaced apart and extend in the direction of a central axis of the guide rail. A second axis of symmetry (S2) extends perpendicularly to the first axis of symmetry (S1). An additional third pair of guide surfaces are disposed on opposite sides of the second axis of symmetry (S2) and have a flattened arrowhead-like sloping roof-shaped configuration and extend in the direction of the central axis.

7 Claims, 1 Drawing Sheet

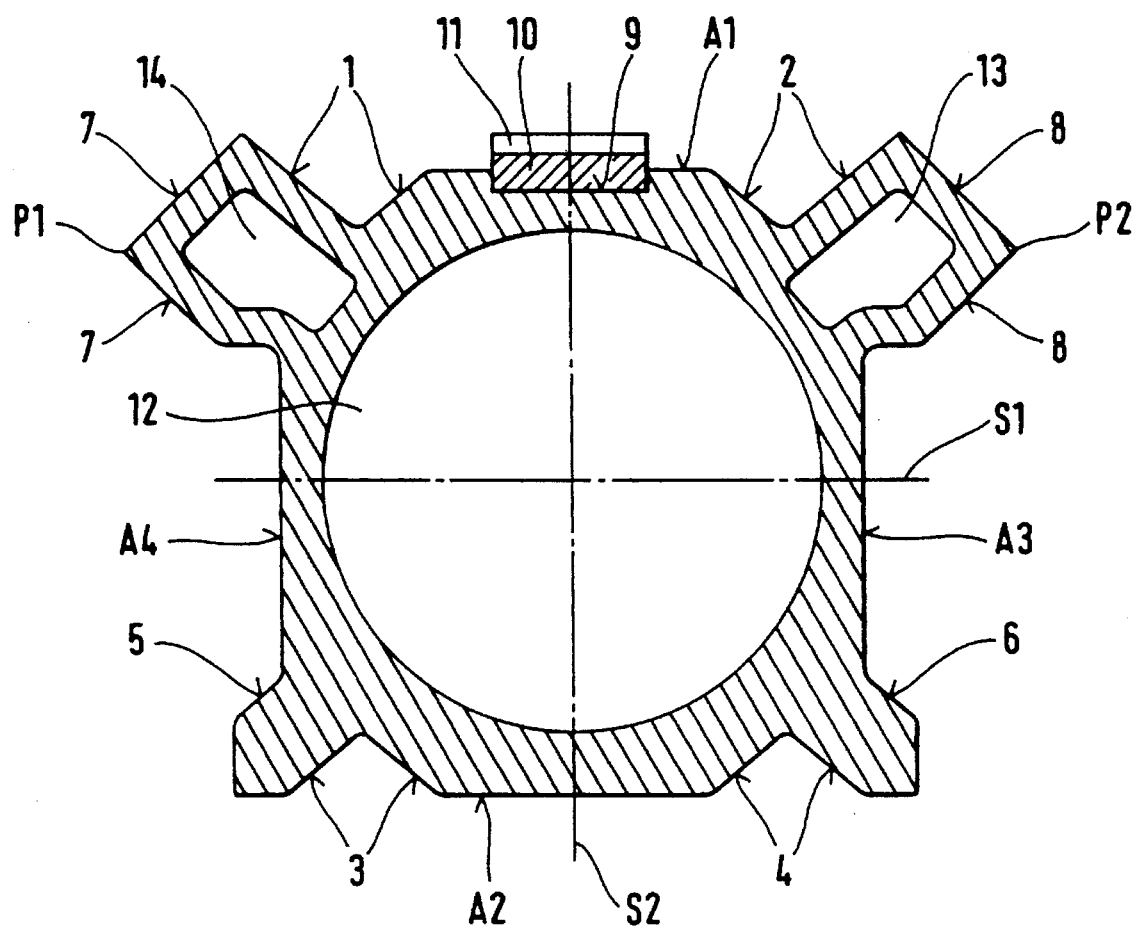

GUIDE RAIL

BACKGROUND OF THE INVENTION

The present invention is directed to an elongated guide rail having a central axis and used with drilling, cutting, and grinding tools. One outwardly facing side of the guide rail has two first pairs of guide surfaces spaced laterally apart and extending in the direction of the central axis of the rail. The guide surfaces are V-shaped and the spacing between the surfaces increases in the outward direction.

It has been noted in manually guided drilling, cutting and grinding tools that a large material loss is experienced due to fracture and scrap when working on a base material, such as concrete, masonry, rock and the like, since an accurate and secure guidance of the tool is impossible manually. In addition, there is considerable danger for the person operating the tool if, for instance, the tool begins to rotate or if the tool is tilted.

Accordingly, a guidance device has been developed and is disclosed in DE-GM 9204693. This known guidance device has a guide rail clamped to a pedestal. The guide rail has two pairs of guide surfaces arranged in a V-shaped manner relative to one another and extending along the long axis of the rail and also located on an outwardly facing side of the guide rail located opposite the pedestal. The recesses formed by the guide surfaces and arranged in a V-shaped manner increase in width towards the outwardly facing side of the rail. A guide trolley, displaceable along the guide rail, engages with slide blocks shaped in a flat arrowhead-like roof-shaped manner and disposed next to each other in the two pairs of guide surfaces. A rock working tool can be attached to this known guide trolley. To prevent the guide trolley from lifting off the guide rail, backup rollers are arranged on the guide trolley protruding into guide recesses of the guide rail and bearing against abutment faces which extend essentially on the bottom side on the two pairs of guide surfaces.

In an arrangement of this known guide rail, extending essentially at right angles to the surface of a base material being worked, high forces are developed by a tool mounted on the guide trolley. These forces engage on one side of the guide rail. Distribution of such forces to the entire cross-section of the guide rail is not assured. A reversal of the of the guide trolley in the circumferential direction of the guide rail through 180° is also not assured.

SUMMARY OF THE INVENTION

Therefore, the primary object of the present invention is to provide a guide rail on which different guide trolleys with different guide regions can be disposed and where a reversal of the guide rail through 180° is assured and affords an adequate distribution of the forces generate across the cross-section.

In accordance with the present invention, two second pairs of guide surfaces arranged in a V-shaped manner are located basically symmetrically to the two first pairs of guide surfaces, and the second pairs of guide surfaces are located on an outer side of the guide rail and extend in the direction of the central axis of the rail.

Due to the inventive arrangement of the guide rail, a guide trolley can be used in an exposed arrangement with guide elements in the form of guide rollers corresponding to the arrangement of the guide surfaces provided in a V-shaped manner, so that the forces which are caused by a tilting movement and torque of a tool mounted on the guide trolley are transferred to the entire cross-section of the guide rail by means of the two outwardly facing sides disposed opposite to one another. Since the lateral spacing between the two first pairs and two second pairs of guide surfaces is substantially the same as the width of one side of the guide rail, a high degree of guidance stability of the guide trolley is assured. Forces arising parallel and basically at right angles to the direction of the central axis of the guide rail are subjected to a particularly good backup.

Preferably, so that the inventive guide rail can be used with different guide trolleys, a second axis of symmetry extends perpendicularly to a first axis of symmetry of the first and second pairs of guide surfaces, with at least one each additional pair of guide surfaces arranged on each side of the second axis of symmetry with these guide surfaces arranged inclined relative to one another and extending in the direction of the central axis of the guide rail. The additional pairs of guide surfaces can be arranged relative to one another in a flattened arrowhead-like roof-shaped manner or in an inwardly directed V-shaped manner. If the guide surfaces are oriented outwardly in a roof-shaped manner, the apex lines of the additional pairs of guide surfaces form the largest outside dimension of the guide rail.

For reasons of manufacturing and force engagement, the apex lines of the additional pairs of guide surfaces are preferably located in the same plane which extends perpendicularly to their axis of symmetry.

It is advantageous if the additional pairs of guide surfaces are located in the region of the two first pairs of guide surfaces, so that the guide regions of the guide trolley can be kept small as far as constructional size is concerned.

The guide rail can be a hollow section. This feature has weight advantages as well as manufacturing advantages.

The guide rail is suited for attachment of two guide trolleys shaped in different ways, whereby their guidance elements engage at two outwardly facing sides of the guide rail located opposite one another. Depending on the manner of its use, the guide rail must be positioned parallel to the surface of the base material, particularly when cutting or grinding, and it must be disposed basically perpendicularly to the surface of the base material when drilling.

If the guide rail is arranged horizontally, a guide trolley must be used which cooperates with the additional pairs of guide surfaces by means of guide elements. If the guide rail is used for drilling, a guide trolley is employed with guide elements which cooperate with the two first and second pairs of guide surfaces.

All the guide surfaces can be hardened, or provided with a hard coating or with hard platelets.

The various features of novelty which characterize the invention are pointed out with particularity in the claims annexed to and forming a part of this disclosure. For a better understanding of the invention, its operating advantages and specific objects attained by its use, reference should be had to the drawing and descriptive matter in which there is illustrated and described a preferred embodiment of the invention.

BRIEF DESCRIPTION OF THE DRAWING

The drawing is a transverse section through a guide rail embodying the present invention.

DETAILED DESCRIPTION OF THE INVENTION

In the drawing, a transverse cross-sectional view of the guide rail embodying the invention, the guide rail is shown as a hollow member. The guide rail has a centrally arranged hollow space of round cross-section which extends in the direction of a central axis. Further, two additional hollow spaces 13, 14 are formed in the exterior structure of the guide rail and extend in the direction of the central axis. As illustrated, the guide rail has four outwardly facing sides A1, A2, A3, A4 with adjacent sides extending perpendicularly to one another. A toothed strip 10 is located in a recess 9 in the outwardly facing side A1 and the toothed strip extends parallel with and in the direction of the central axis of the guide rail. The length of the toothed strip 10 corresponds at least partially to the overall length of the guide rail and it has a toothed-like profile 11. The outwardly facing side A1 has two first pairs of guide surfaces 1, 2 extending in the direction of the central axis and spaced laterally apart on opposite sides of the central axis with the guide surfaces disposed in a V-shaped manner and forming recesses the width of which increases in the outward direction from the central axis of the guide rail.

In outwardly facing side A2, two second pairs of guide surfaces 3, 4 are arranged in a V-shaped manner symmetrical to and opposite the first pairs of guide surfaces 1, 2. The two second pairs of guide surfaces 3, 4 are disposed laterally spaced apart from one another and extend in the direction of the central axis of the rail.

Further, the guide rail has clamping faces 5, 6 extending in the direction of the central axis of the guide rail and located in the region of the second pairs of guide surfaces 3, 4. Each clamping surface 5, 6 serves to engage clamping elements, not shown, so that the guide rail can be fixed on a surface of a base material, also not shown. In this manner it is possible to secure a guide rail embodying the invention to a base material whereby the outwardly facing side A2 with the two second pairs of guide surfaces 3, 4 rest on the surface of the base material. In such an attachment of the guide rail, guide trolleys for cutting and grinding tools are used and engage at the additional pairs of guide surfaces 7, 8 of the guide rail located in the region of the outwardly facing sides A3, A4 extending at right angles to the base material. As viewed in the drawing the guide surfaces 7, 8 are located laterally outwardly from the upwardly facing surface A1.

The toothed strip 10, which extends at least partially along the entire length of the guide rail, is located in the outwardly facing side A1 of the guide rail and is parallel to and extends in the direction of the central axis.

As mentioned above, the outwardly facing sides A3, A4 of the guide rail have two additional pairs of guide surfaces, 7, 8 which are formed in a flattened arrowhead-like sloping roof-shaped manner.

As viewed in the drawing, there are two axes of symmetry S1, S2 extending perpendicular to one another with the intersection of the two axes forming the central axis of the guide rail. The first axis of symmetry S1 forms the axis of symmetry for the two first and two second pairs of guide surfaces 1, 2, 3, 4. The second axis of symmetry S2, disposed perpendicularly to the first axis of symmetry S1, and forms the axis of symmetry for the two additional pairs of guide surfaces 7, 8. The apex points or lines P1, P2 where the additional pairs of guide surfaces 7, 8 intersect, are located in the region of the two first pairs of guide surfaces 1, 2.

While a specific embodiment of the invention has been shown and described in detail to illustrate the inventive principles, it will be understood that the invention may be embodied otherwise without departing from said principles.

I claim:

1. Guide rail for use with drilling, cutting and grinding tools, said guide rail having a central axis and a plurality of outwardly facing sides extending in the direction of and spaced outwardly from the central axis, two first pairs of laterally spaced guide surfaces (1, 2) arranged in a first one (A1) of said outwardly facing sides and extending in the direction of the central axis, each said first pair of guide surfaces (1, 2) arranged to form an outwardly facing V-shaped recess with the recess having a width increasing outwardly, wherein the improvement comprises two second pairs of laterally spaced guide surfaces (3, 4) arranged in an outwardly directed second one (A2) of said outwardly facing side and extending in the direction of the central axis, each said second pairs of guide surfaces (3, 4) are located symmetrically opposite said two first pairs of guide surfaces (1, 2) and said second pairs of guide surfaces are V-shaped, a first axis of symmetry (S1) forms an axis of symmetry for said first and second pairs of guide surfaces (1, 2, 3, 4), a second axis of symmetry (S2) extends perpendicularly to said first axis of symmetry (S1), and additional pair of guide surfaces (18) are disposed on opposite sides of and symmetrical with respect to said second axis of symmetry (S2), and additional pairs of guide surfaces (7, 8) are inclined at an angle to one another and extend in the direction of the central axis of said guide rail.

2. Guide rail, as set forth in claim 1, wherein each of said additional pairs of guide surfaces (7, 8) intersect at an apex line (P1, P2) and said apex lines are located in a plane extending perpendicularly to the second axis of symmetry (S2).

3. Guide rail, as set forth in claim 2, wherein said additional pairs of guide surfaces (7, 8) are located in the region of said two first pairs of guide surfaces (1, 2).

4. Guide rail for use in drilling, cutting and grinding tools, said guide rail having a central axis and a plurality of outwardly facing sides extending in the direction of and spaced outwardly from the central axis, two said first pairs of laterally spaced guide surfaces (1, 2) arranged in a first one (A1) of said outwardly facing sides and extending in the direction of the central axis, each said first pair of guide surfaces (1, 2) arranged to form an outwardly facing V-shaped recess with the recess having a width increasing outwardly, wherein the improvement comprises that said guide rail has a first axis of symmetry (S1) with said two first pairs of guide surfaces (1, 2) located on one side of said first axis of symmetry (S1) and a second axis of symmetry (S2), extending perpendicularly to said first axis of symmetry (S1) with said first pairs of guide surfaces (1, 2) each located on opposite side of said second axis of symmetry (S2) from the other said pair, two second pairs of laterally spaced guide surfaces (3, 4) located in an oppositely directed second one (A2) of said outwardly facing sides extending in the direction of the central axis, each said second pair of guide surfaces (3, 4) located symmetrically opposite said two said first pairs of guide surfaces (1, 2) on the opposite side of said first axis of symmetry (S1) from said pairs of guide surfaces, said second pair of guide surfaces (3, 4) are V-shaped and the width of the V-shaped surfaces increases outwardly from the central axis, each of said first and second pairs of guide surface are located on an opposite side of said second axis of symmetry (S2) from the other, additional pairs of guide surfaces (7, 8) are located on opposite sides of the second axis of symmetry (S2) and each of said guide surfaces of said additional pairs of the guide surfaces are inclined relative to one another and extend in the direction of the central axis of the rail.

5. Guide rail, as set forth in claim 4, wherein said guide rail is a hollow section with a round hollow interior.

6. Guide rail, as set forth in claim 4, wherein each said additional pairs of guide surfaces intersect at an apex line (P1, P2) and said apex lines are located in a plane extending perpendicularly to the second axis of symmetry (S2).

7. Guide rail, as set forth in claim 6, wherein said additional pairs of guide surfaces (7, 8) are located in the region of said two first pairs of guide surfaces (1, 2), said additional pairs of guide surfaces are each located in an opposite outwardly facing side (A3, A4) of said guide rail and are located at the intersection with said outwardly facing side (A1) containing said first pairs of guide surfaces (1, 2), and said outwardly facing sides (A3, A4) containing said additional pairs of guide surfaces form hollow sections (13, 14) located inwardly from said additional pairs of guide surfaces (7, 8).

* * * * *